(No Model.)
J. R. NEWTON.
CULTIVATOR DISK.
No. 536,094.                                  Patented Mar. 19, 1895.
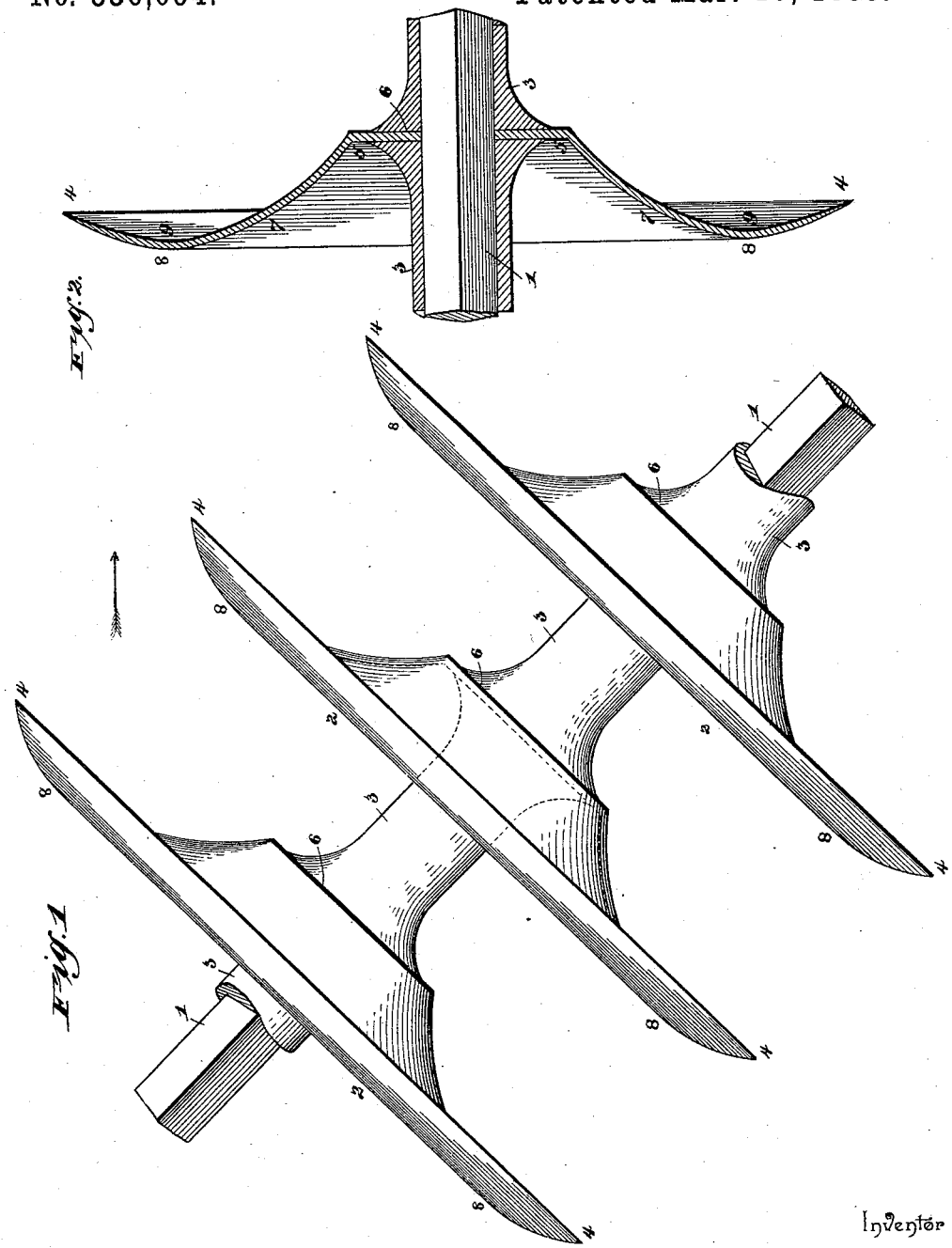
Witnesses                                                Inventor
                                              John R. Newton.
                        By his Attorneys.
                                              C. A. Snow & Co.

UNITED STATES PATENT OFFICE.

JOHN R. NEWTON, OF CARTHAGE, ILLINOIS, ASSIGNOR OF ONE-HALF TO IRVING MAYOR, OF SAME PLACE.

CULTIVATOR-DISK.

SPECIFICATION forming part of Letters Patent No. 536,094, dated March 19, 1895.

Application filed October 29, 1894. Serial No. 527,301. (No model.)

*To all whom it may concern:*

Be it known that I, JOHN R. NEWTON, a citizen of the United States, residing at Carthage, in the county of Hancock and State of Illinois, have invented a new and useful Cultivator-Disk, of which the following is a specification.

My invention relates to an improved form of disk designed for use in connection with disk harrows, plows, planters, pulverizers, and analogous implements, and the objects in view are to provide a disk of such construction as to be self-clearing or scouring, by which it is meant that the soil, in passing over the front or working surface thereof, is guided upward or from the disk and is compressed laterally to cause sufficient friction on said working face to maintain the same in a smooth and bright condition, and thus prevent packing or clogging; and, furthermore, to provide a construction whereby the disk performs the function of a mold-board, thus turning the soil and throwing it beyond the cutting edge of the disk.

The ordinary form of disk for implements of the class named has a continuous concave working surface which recedes more or less abruptly from the cutting edge to the center of the disk, which is the lowest point or bottom of the cavity. Inasmuch as the portion of the disk contiguous to the cutting edge must be arranged in a plane parallel with the direction of movement of the machine, it will be seen that a disk having a continuous concave working surface will only compress the soil laterally in rear of its center. In other words, the portion of the disk in front of its center lies almost directly in rear of the cutting edge, and the entire return-curve, which approaches the plane of the cutting edge, is in rear of the center or axis of rotation of the disk. Thus, all of the lateral pressure exerted by the disk being in rear of its center, and the portion of the disk in rear of its center having an upward movement, it is obvious that earth which is cohesive or sticky in its character will have a tendency to cling to the working surface and turn with the disk, thus adding to the weight of the apparatus and interfering with its clean-cutting action; also the resistance offered by friction to the rear or ascending portion of the disk has a tendency to check or retard the forward rotation of the disk, and hence prevent the same from cutting properly into the soil, and in order to overcome or neutralize this resistance and cause the disk to sink effectively into the soil, it is necessary to add weight to the framework. This increased resistance is in addition to that which is caused by the necessary use of scrapers for preventing the accumulation of soil at the center of the disk.

I am aware, also, that disks have been constructed with raised or convex centers, such center approaching or extending to the plane of the cutting edge, thus relieving, partially, the rear or ascending portion of the disk, but in order to secure the self-clearing and scouring action, above referred to, to avoid unnecessary friction or resistance caused by the abrupt presentation of any portion of the surface of the disk to the soil, and to cause the disk to turn the soil in a manner similar to a mold-board. In other words, to provide a self-scouring soil-turning disk, capable of performing the same functions as a mold-board plow with greater facility by reason of the rotation, and hence greater penetrating or cutting power than such a plow, is the essential object of my invention.

Further objects and advantages of the invention will appear in the following description, and the novel features thereof will be particularly pointed out in the appended claims.

In the drawings—Figure 1 is a plan view of a gang of disks constructed in accordance with my invention. Fig. 2 is a transverse section of one of the disks.

Similar numerals of reference indicate corresponding parts in both the figures of the drawings.

1 designates a shaft to which are attached the disks 2, embodying my invention, and spaced apart upon said shaft by means of the spools 3.

The front or working face of the improved disk is concave from the cutting edge 4, to the extremity of the raised central portion 5. This raised center is approximately trunco-conical in construction with a flat outer surface 6, and concave sides 7. The portion of the disk contiguous to the cutting edge thereof recedes from the plane of such cutting edge to the point 8, which indicates the bottom or lowest point of an annular depression formed parallel with the cutting edge. The working surface of the disk from the cutting edge 4 to the bottom of the annular depression, which is indicated by the numeral 9, is concave, but approaches a plane, in that a section thereof, as shown in Fig. 2, is an arc of a circle of large diameter, and the disk is so mounted upon the machine as to arrange this approximately plane surface at the front of the disk in a plane parallel with the direction of movement of the machine, whereby the cutting of the edge into the soil will not be retarded, and there will be no lateral pressure upon this portion of the disk to prevent it from sinking into the soil.

The portion of the surface of the disk from the point 8 at the bottom of the annular depression to the extremity of the central projection is concave, and approximately is the arc of a circle struck by a shorter diameter than that of the portion of the disk adjacent to the cutting edge. The bottom or floor of the annular depression 9, by which the shallow curve which extends from the point 4 to the point 8, is connected to the deeper curve described between the point 8 and the extremity of the central projection, is an abrubt curve.

The central projection preferably extends beyond the plane of the cutting edge of the disk and although the extent of projection may be varied according to the character of the soil in which the disk is to be used, I have found that a projection of from one-half to two inches in a disk of sixteen inches diameter is effective, for the reason that this projection has proved sufficient to carry the soil beyond the cutting edge and at the same time turn it in a manner similar to that of a mold-board plow.

From the point 8, which is the bottom of the annular depression, the working surface of the disk approaches the extremity or outermost portion of the central projection, and, therefore, from this point 8 to the extremity of the projection a lateral pressure is exerted upon the soil, thus tending to compress the latter and by the friction produced by such compression the soil effects the scouring of this portion of the surface of the disk. It is unnecessary to provide special construction for the scouring of the portion of the disk between the cutting edge and the bottom of the annular depression, for the reason that the contact of this portion of the disk with the soil in cutting thereinto has the desired effect, and will have this effect irrespective of the construction, as it is true with regard to other disks, but in order to secure a scouring action upon the portion of the disk between the bottom of the annualar depression and the extremity of the central projection, it is necessary to provide a concave surface of gradual curvature, which will produce lateral compression of the soil without presenting an abrupt surface. In other words, it is necessary to provide a surface which will cause the soil to have a sliding or frictional contact, whereby, as the disk progresses, the successive portions of soil as they are turned up push the preceding mass in a direction approximately parallel with the surface of the disk.

The bottom of the annular depression is preferably arranged close to the cutting edge, whereby the lateral pressure caused by the portion of the disk between the point 8 and the extremity of the central projection may be secured, whether the disk is cutting a deep or shallow furrow. In order to attain the necessary depth to the annular depression and form a continuous concave surface from the cutting edge to the extremity of the central projection, it is obvious that the bottom of this depression will be arranged approximately half-way between the cutting edge and the top of the projection, and therefore, in order to secure the lateral pressure upon the soil necessary to produce the desired scouring of the face of the disk, it is necessary to depress the disk a distance equal, approximately, to one-half its radius. Thus, an important advantage of the improved disk would be lost, except in deep cutting; but by arranging the bottom of the depression near the cutting edge, this being attained by the relative abruptness of the curves, as above set forth, the said advantage, namely, that of scouring, is secured in shallow as well as deep plowing.

Having described my invention, what I claim is—

1. A disk having a concave working face which recedes from the cutting edge to form an annular depression and which advances from the bottom of said depression to a point beyond the plane of the cutting edge to form a central conical projection, whereby the portion of the working face of the disk between the bottom of the annular depression and the extremity of said central projection exerts a lateral pressure upon the soil and causes the latter to scour said surface, substantially as specified.

2. A disk having a concave working face which recedes from its cutting-edge to form an annular depression and then approaches and passes the plane of the cutting-edge to form a central projection which extends beyond the cutting-edge, the surface of the disk between the cutting-edge and a point adjacent to the bottom of said annular depression being slightly curved, and the portion of the surface between the extremity of the central projection and a point adjacent to the bottom of said depression being abruptly curved, the said slightly and abruptly curved portions of the surface being connected by a more abruptly curved surface which forms the bottom of the depression, substantially as specified.

3. A disk constructed of even thickness throughout, having a concave working face which recedes from the cutting-edge to form an annular depression, and which advances from the bottom of said depression to a point beyond the plane of the cutting-edge to form a central conical projection, the extremity of said projection being formed by a flat surface parallel with the plane of the cutting edge of the disk, substantially as specified.

In testimony that I claim the foregoing as my own I have hereto affixed my signature in the presence of two witnesses.

JOHN R. NEWTON.

Witnesses:
   JOHN H. SIGGERS,
   G. C. SHOEMAKER.